US007079878B2

(12) United States Patent
Odachi et al.

(10) Patent No.: US 7,079,878 B2
(45) Date of Patent: *Jul. 18, 2006

(54) PORTABLE RADIO TERMINAL CAPABLE OF OBTAINING GOOD POLARIZATION EFFICIENCY REGARDLESS OF POSITION AND DIRECTION OF ANTENNA

(75) Inventors: Noriaki Odachi, Yokohama (JP); Syuichi Sekine, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 226 days.

This patent is subject to a terminal disclaimer.

(21) Appl. No.: 10/761,328

(22) Filed: Jan. 22, 2004

(65) Prior Publication Data

US 2004/0152497 A1 Aug. 5, 2004

Related U.S. Application Data

(63) Continuation of application No. 09/777,911, filed on Feb. 7, 2001, now Pat. No. 6,701,167.

(30) Foreign Application Priority Data

Feb. 9, 2000 (JP) .............................. 2000-32087

(51) Int. Cl.
*H04M 1/00* (2006.01)

(52) U.S. Cl. ..................... 455/575.7; 455/80; 455/107; 455/280; 333/17.3

(58) Field of Classification Search ............. 455/575.7, 455/80–82, 107, 280–282; 333/17.3, 124; 343/702, 750, 850, 852
See application file for complete search history.

(56) References Cited

U.S. PATENT DOCUMENTS

| | | | |
|---|---|---|---|
| 3,622,890 A | 11/1971 | Fujimoto et al. | |
| 5,634,203 A | 5/1997 | Ghaem | |
| 5,969,688 A | 10/1999 | Ireland | |
| 6,064,868 A | 5/2000 | Kobayashi | |
| 6,104,356 A | 8/2000 | Hikuma et al. | |
| 6,211,830 B1 * | 4/2001 | Monma et al. | 343/702 |
| 6,526,263 B1 | 2/2003 | Saito | |

FOREIGN PATENT DOCUMENTS

| | | |
|---|---|---|
| EP | 0 611 199 | 8/1994 |
| EP | 0 652 646 | 5/1995 |
| WO | WO 99/65108 | 12/1999 |

* cited by examiner

*Primary Examiner*—Lee Nguyen
(74) *Attorney, Agent, or Firm*—Oblon, Spivak, McClelland, Maier & Neustadt, P.C.

(57) ABSTRACT

A portable radio terminal comprises a housing, a radio circuit included in the housing, a matching circuit mounted on the top of the housing at a position which is offset from the longitudinal center line of the housing, a load connected to the tip of the matching circuit, and a linear antenna connected to the load. This portable radio terminal further comprises load changing means for changing the value of the load. The matching circuit may comprise a meander matching element, a zigzag-shaped matching element, a helical matching element, a conical matching element, a rectangular helical matching element or a pyramid helical matching element which are formed so as to a predetermined shape, such as a meander shape, a zigzag shape, a helical shape, a conical shape, a rectangular helical shape or pyramid helical shape. Thus, even if the terminal is held in a user's left or right hand, it is possible to increase the quantity of radiation of vertically polarized waves, so that it is possible to provide the optimum antenna construction to carry out good radio communication.

1 Claim, 8 Drawing Sheets

HELD IN LEFT HAND

HELD IN RIGHT HAND

PORTABLE RADIO TERMINAL CAPABLE OF OBTAINING GOOD POLARIZATION EFFICIENCY REGARDLESS OF POSITION AND DIRECTION OF ANTENNA

CROSS-REFERENCE TO RELATED APPLICATIONS

This application is a continuation of and claims the benefit of priority under 35 USC §120 from U.S. application Ser. No. 09/777,911, filed Feb. 7, 2001 now U.S. Pat. No. 6,701,167, and is based upon and claims the benefit of priority under 35 USC §119 from Japanese Patent Application No. 2000-32087, filed Feb. 9, 2000, the entire contents of which are incorporated herein by reference.

BACKGROUND OF THE INVENTION

The present invention relates generally to a portable radio terminal. More specifically, the present invention relates to a method for constructing a linear antenna provided at a position which is offset from the longitudinal center line of a housing.

In general, portable radio terminals represented by PDCs (Personal Digital Cellular systems) are used for carrying out voice conversations, and are often held in any hand of a talking person near the external ear capsule of the head of the human body to be used. There are some cases where the transmitting/receiving characteristics of radio waves on the antenna vary in accordance with which hand of the talking person holds a radio terminal. First, this phenomenon will be described below.

FIGS. 1A and 1B are illustrations showing the difference in position of an antenna 3 with respect to a housing 2 in accordance with which hand of a user holds a conventional portable radio terminal 1. FIG. 1A shows a case where the portable radio terminal 1 is held in the user's left hand, and FIG. 1B shows a case where the portable radio terminal 1 is held in the user's right hand. As shown in FIGS. 2A and 2B, the portable radio terminal 1 is generally inclined at, e.g., about 60°, with respect to the vertical direction to be used.

As can be clearly seen from FIGS. 1A through 2B, the relative position of the antenna 3 with respect to the housing 2 is different between the case where the portable radio terminal 1 is held in the left hand as shown in FIGS. 1A and 2A and the case where it is held in the right hand as shown in FIGS. 1B and 2B. When the portable radio terminal is held in the left hand as shown in FIGS. 1A and 2A, the antenna 3 is arranged on the lower side of the housing 2 than that when the portable radio terminal is held in the right hand as shown in FIGS. 1B and 2B. Assuming that the state shown in FIGS. 1A and 2A is a state that the antenna is arranged on the lower side and that the state shown in FIGS. 1B and 2B is a state that the antenna is arranged on the upper side, these states will be described below. That is, the portable radio terminal 1 is used in a state that the position of the antenna varies in accordance with which hand of the user holds the portable radio terminal 1.

In portable radio terminals, it is known that the radiation of radio waves from the housing 2 itself can not ignored. In particular, a high-frequency current is greatly distributed in the upper portion of the housing 2 near the feeding point for the antenna 3, and there are also some cases where the radiation of radio waves from the high-frequency current serving as a wave source is equal to the radiation from the antenna 3. That is, as shown in FIGS. 3A and 3B, the radiation of radio waves from the portable radio terminal 1 is carried out by the vector sum of the high-frequency currents on the antenna 3 and the upper portion of the housing 2. Since the relationship between the high-frequency currents and the radiation field is a proportional relationship, the high-frequency current will be discussed below.

FIGS. 3A and 3B show a vector sum when the current on the upper portion of the housing 2 is substantially equal to the current on the antenna 3. As can be clearly seen from FIGS. 3A and 3B, in the case of the holding in the left hand shown in FIG. 1A, the vector sum extends substantially in a horizontal direction as shown in FIG. 3A, and in the case of the holding in the right hand shown in FIG. 1B, the vector sum extends substantially in a vertical direction as shown in FIG. 3B. That is, the polarization characteristic, which is an important point of the characteristics of the antenna, is greatly different between the holding in the right hand and the holding in the left hand.

In portable radio terminals, the antenna of the base station often has the vertical polarization. Therefore, in order to enhance the polarization efficiency between the antenna of the terminal and the antenna of the base station, it is desired that the antenna of the terminal also has the vertical polarization. In the cases shown in FIGS. 3A and 3B, the polarization in the case of the holding in the right hand shown in FIG. 1B is closer to the vertical polarization than that in the case of the holding in the left hand shown in FIG. 1A, so that the holding in the right hand is desired as the characteristics of the antenna. Therefore, even if the antenna is arranged so as to be offset in the hope that the terminal is held in the right hand as shown in FIG. 1B, if the hand holding the terminal is changed, the polarization of the antenna 3 is close to the horizontal polarization shown in FIG. 1A, so that it is clear that the polarization efficiency remarkably deteriorates.

In the above description, the antenna 3 is mounted on the housing 2 so as to be offset downwards when the terminal is held in the left hand. However, this is the same if the antenna 3 is mounted on the housing 2 so as to be offset upwards when the terminal is held in the left hand. In this case, the characteristics of the antenna that the polarization efficiency in the case of the holding in the left hand is higher than that in the case of the holding in the right hand are enhanced. However, also in this case, if the portable radio terminal is held in the right hand, the polarization of the antenna is substantially the horizontal polarization that the antenna is arranged on the lower side, so that the polarization efficiency deteriorates.

The reason why the characteristics in the case of the holding in the left hand are different from those in the case of the holding in the right hand is that the portable radio terminal 1 is asymmetric. Therefore, by arranging the antenna 3 at the center of the portable radio terminal so that the whole portable radio terminal 1 including the antenna 3 is symmetric, the difference in characteristics due the holding hand can be removed. However, if the antenna 3 is provided at the center, there is the following problem.

In general, the antenna 3 of the portable radio terminal 1 is extensible in the longitudinal direction of the housing 2, so that the antenna 3 can be housed in the housing 2. When the antenna 3 is housed in the housing 2, if the antenna 3 is arranged at the center, a space for housing the antenna 3 must be ensured in the central portion of the terminal 1. However, a radio circuit and battery for a radio transmitter (not shown) are arranged in this portion, in which it is difficult to simply ensure the space for housing the antenna.

Therefore, it is not realistic to provide the antenna housing space at the center of the housing 2.

Thus, in conventional portable radio terminals, there is a problem in that the polarization characteristics vary in accordance with which hand holds the terminal 1, so that the polarization efficiencies of radio waves from the base station having the vertical polarization characteristics and the antenna remarkably deteriorate to make communication impossible. Furthermore, the antenna of the base station must emit uniformly over 360 degrees on the horizontal plane, so that the use of an antenna having the vertical polarization is by far effective in view of the decrease of the costs for the antenna.

As described above, in the antenna for use in the conventional portable radio terminal, the difference in quality of the performance of the antenna is caused by the difference in polarization characteristics of transmitted/received radio waves between when the terminal is held in the user's left hand and when the terminal is held in the user's right hand, so that there is a problem in that the portable radio terminal can not optimally be operated according to the state that the terminal is held.

SUMMARY OF THE INVENTION

It is therefore an object of the present invention to eliminate the aforementioned problems and to provide a portable radio terminal which can be optimally operated if the terminal is held in any one of user's left and right hands to be used and which greatly improve the deterioration of radiation characteristics produced in an antenna.

In order to accomplish the aforementioned and other objects, a portable radio terminal according to a basic construction of the present invention is a portable radio terminal for improving the quality of a polarization efficiency caused by the fact that the terminal is held in a user's left or right hand, the terminal comprising: a housing configured to house various components; a radio circuit included in the housing; a matching circuit, provided in the vicinity of one end face perpendicular to a longitudinal direction of the housing, and configured to match radio waves during communication; a linear antenna which extends from the one end face of the housing along a longitudinal one side of the housing; and a load circuit which is provided between the tip of the matching circuit and the base end of the linear antenna and which has a variable load value.

According to one aspect of the present invention, in the portable radio terminal according to the basic construction, the load circuit may vary the load value so as to always improve a polarization efficiency regardless of the position and direction of the linear antenna which are based on how to hold the housing.

In portable radio terminal according to the aspect of the present invention, the load circuit may have the function of changing the value of the load so as to increase the quantity of radiation of vertically polarized waves radiated from said housing.

In the portable radio terminal according to the aspect of the present invention, the load circuit may have the function of changing the value of the load so as to increase the quantity of radiation of horizontally polarized waves radiated from said housing.

In the portable radio terminal according to the aspect of the present invention, the matching circuit may be provided at a position which is offset from the longitudinal center line of the housing.

In the portable radio terminal according to the aspect of the present invention, the load circuit may comprise a plurality of reactances and electronic switches, each of which is connected to a corresponding one of the reactances, and the portable radio terminal may further comprise a control circuit for changing the value of the load of the load circuit by controlling the electronic switches.

In the portable radio terminal with the above described construction, at least one of the plurality of reactances may be a short-circuiting line, and each of the remaining reactances may comprise a combination of a capacitor and a coil.

In the portable radio terminal according to the aspect of the present invention, the load circuit may comprise a plurality of reactances and a mechanical switch connected to the reactances, and the portable radio terminal may further comprise a control circuit for changing the value of the load of the load circuit by controlling the mechanical switch.

In the portable radio terminal with the above described construction, at least one of the plurality of reactances is may be a short-circuiting line, and each of the remaining reactances may comprise a combination of a capacitor and a coil.

In the portable radio terminal according to the aspect of the present invention, the load circuit may be capable of switching at least the value of the load to any one of a short-circuit value, an open value and a capacitive value.

The portable radio terminal according to the aspect of the present invention may further comprise expanding and contracting means for causing the linear antenna to be mechanically extended and retracted, and in the portable radio terminal, the end portion of the linear antenna may be connected to the load circuit when the linear antenna is extended, and the tip portion of the linear antenna may be connected to the load circuit when the linear antenna is retracted.

In the portable radio terminal according to the aspect of the present invention, the matching circuit may comprise a linear matching element.

In the portable radio terminal with the above described construction, the linear matching element may be a linear element which is formed so as to have a predetermined shape, the linear element having an electric length of any one of a quarter wavelength, a half-wavelength and a three quarter-wavelength.

In the portable radio terminal with the above-described construction, the linear matching element may be a meander element which is formed so as to have a meander shape as the predetermined shape.

In the portable radio terminal with the above-described construction, the linear matching element may be a zigzag-shaped element, which is formed so as to have a zigzag shape as the predetermined shape.

In the portable radio terminal with the above-described construction, the linear matching element may be a helical element, which is formed so as to have a helical shape as the predetermined shape.

In the portable radio terminal with the above-described construction, the linear matching element may be a conical element, which is formed so as to have a conical helical shape as the predetermined shape.

In the portable radio terminal with the above-described construction, the linear matching element may be a rectangular helical element, which is formed so as to have a rectangular helical shape as the predetermined shape.

In the portable radio terminal with the above-described construction, the linear matching element may be a pyramid helical element, which is formed so as to have a pyramid helical shape as the predetermined shape.

In the portable radio terminal with the above-described construction, the linear matching element may function as a small antenna.

BRIEF DESCRIPTION OF THE DRAWINGS

In the drawings:

FIGS. 2A and 2B are illustrations for explaining that the polarization characteristic varies in accordance with the position of an antenna, wherein FIG. 2A shows the polarization characteristic when the terminal is held in the user's left hand and FIG. 2B shows the polarization characteristic when the terminal is held in the user's right hand;

FIGS. 3A and 3B are illustrations for explaining that the polarization characteristic varies in accordance with the position of an antenna, wherein FIG. 3A shows the polarization characteristic when the terminal is held in the user's left hand and FIG. 3B shows the polarization characteristic when the terminal is held in the user's right hand;

DESCRIPTION OF THE PREFERRED EMBODIMENTS

Referring now to the accompanying drawings, some preferred embodiments of a portable radio terminal according to the present invention will be described below.

Figure 1A:
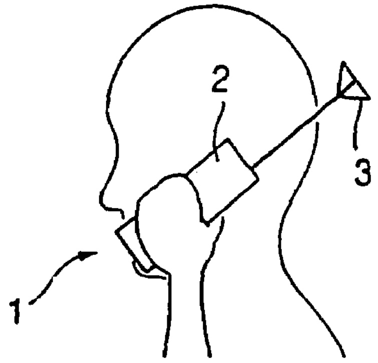
FIG. 1A PRIOR ART
FIG. 1A is an illustration showing the state that a portable radio terminal according to the present invention or a conventional portable radio terminal is held in a user's left hand to be used.
Figure 1B:
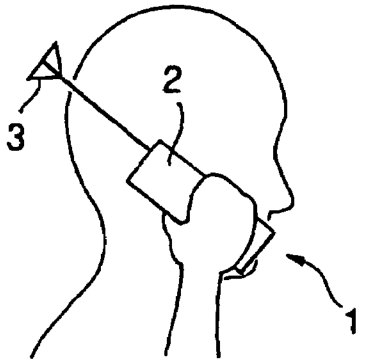
FIG. 1B PRIOR ART
FIG. 1B is an illustration showing the state that the terminal is held in the user's right hand to be used.
Figure 2A:
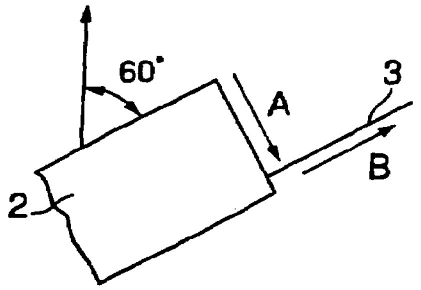
FIG. 2A PRIOR ART
Figure 2B:
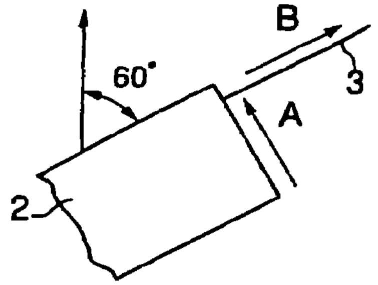
FIG. 2B PRIOR ART
Figure 3A:
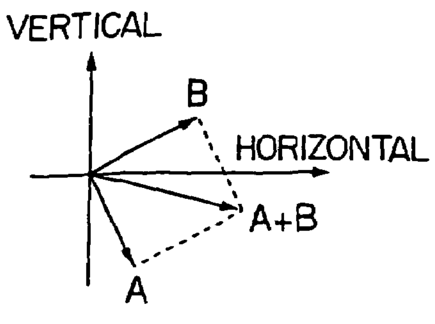
FIG. 3A PRIOR ART
Figure 3B:
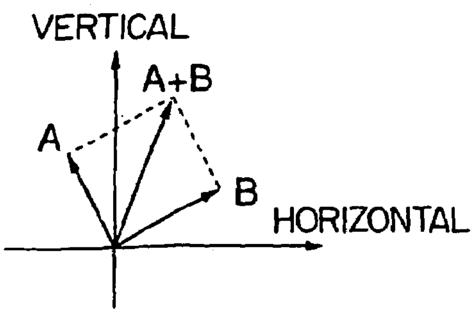
FIG. 3B PRIOR ART
Figure 4:
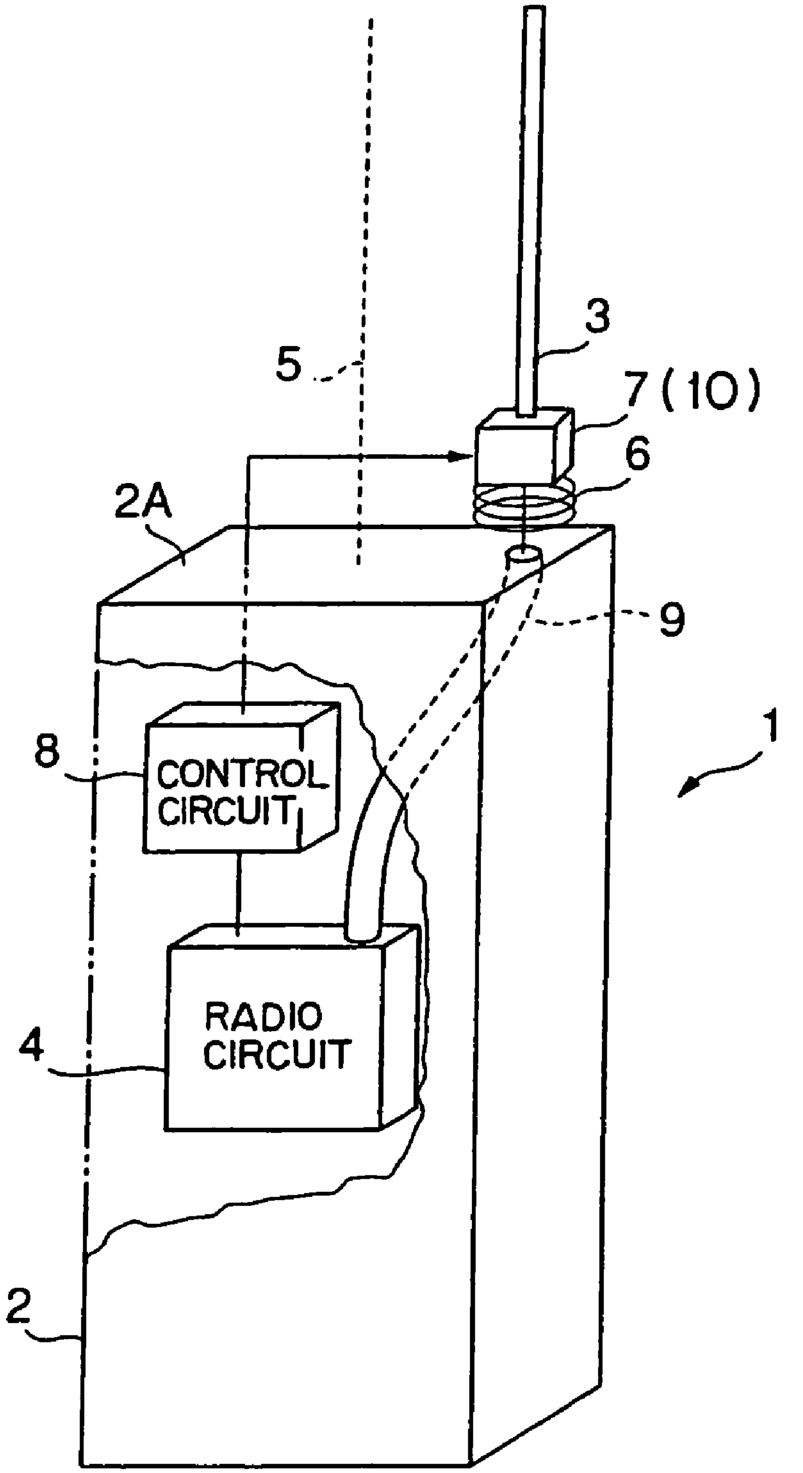
FIG. 4 is a perspective view showing the construction of the first preferred embodiment of a portable radio terminal according to the present invention.

First, referring to the accompanying drawings, the first preferred embodiment of a portable radio terminal according to the present invention will be described. FIG. 4 shows the construction of the first preferred embodiment of a portable radio terminal according to the present invention. The portable radio terminal 1 comprises: a housing 2; a linear antenna 3; a radio circuit included in the housing 2; a matching circuit 6 mounted on the top of the housing 2 at a position offset from a longitudinal center line 5 of the housing 2; and a load 7 connected to the tip of the matching circuit 6. The load 7 is connected to the linear antenna 3, and includes load changing means 10 (the details of which are not shown in FIG. 4) configured to change the value of the load 7, and a control circuit 8 for controlling the load changing means 10.

The lower end of the matching circuit 6 is provided with a feeder line 9, through which the output of the radio circuit 4 is fed to the matching circuit 6. By the load changing means, the coupling state between the matching circuit 6 and the linear antenna 3 can be changed. Although the load changing means 10 includes the load 7 in FIG. 4, the load changing means 10 has the function of changing the value of the load 7 between the linear antenna 3 and the matching circuit 6 with any one of constructions which will be described later.

With respect to the physical length of each portion, it is assumed that the linear antenna 3 is a monopole antenna having a length of a half-wavelength and that the matching circuit 6 is an element electrically having a length of a quarter wavelength. With this construction, the combination of the matching circuit 6 with the linear antenna element 3 has a length of a three quarter wavelength, and equivalently operates as a monopole antenna, so that the impedance of the antenna viewed from the feeding point approximates 50 Ω. As a result, the impedance of the feeder line 9 is easily matched with the impedance of the antenna 3.

The matching circuit 6 may comprise a distributed element or a lumped element. The distributed element may comprise a strip line having a length of a quarter wavelength, and the lumped element may comprise an LC series resonance circuit wherein an L (inductance) is arranged in the vicinity of the feeding point. Alternatively, the matching circuit 6 may comprise a linear matching element electrically having a length of a quarter wavelength.

The load 7 is required to form the coupling state between the matching circuit 6 and the linear antenna 3 as the short-circuit coupling (0 Ω), the capacitive coupling or the loose coupling (∞ Ω). In the case of the short-circuit coupling, the matching circuit 6 may be connected to the linear antenna 3 in the form of direct current. In this case, the load 7 may be a short-circuiting line. In order to form the loose coupling, the linear antenna 3 and the matching circuit 6 may be arranged so as to be apart from each other via a space at an interval (e.g., about a fraction of a wavelength). In this case, the load 7 is the space, and the value of the load is ∞ Ω.

In the case of the capacitive coupling, there are two methods, one of which is a method for arranging the matching circuit 6 so as to approach the linear antenna 3 via a space (e.g., about a friction of tenth wavelength), and the other of which is a method using a capacitor as the load 7.

With such constructions, even if the portable radio terminal is held in any one of the user's left and right hands, the optimum antenna construction is obtained. The operation of the portable radio terminal will be described below.

Figure 5:
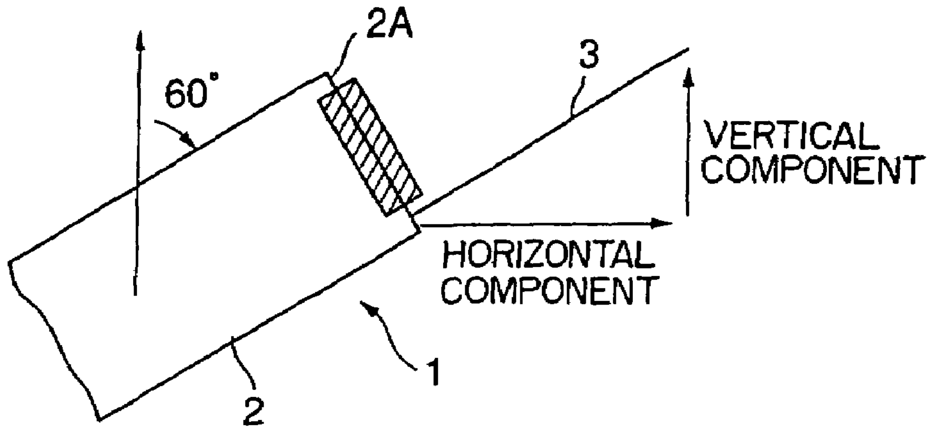
FIG. 5 is an exploded view of vertical and horizontal polarization when the first preferred embodiment of a portable radio terminal according to the present invention is inclined.

It will be considered that the portable radio terminal is held in a user's hand to be inclined at an angle of 60° with respect to the ground to be used near the user's head. In this case, since the linear antenna 3 is inclined at an angle of 60° as shown in FIG. 5, horizontally polarized waves are mainly emitted. Because, if the antenna is decomposed into a horizontal component and a vertical component, the horizontal component is the square root of three times as large as the vertical component, as can be clearly seen from a formula of 1:2: the square root of three.

However, in an actual portable radio terminal, since polarized waves emitted from the antenna of a base station are often vertically polarized waves as described above, polarized waves emitted from the antenna of the portable radio terminal are also preferably vertically polarized waves in order to enhance polarization efficiency. In addition, as described above, radio waves emitted from the portable radio terminal are not only emitted from the antenna, but the waves are also emitted from the housing. The radio waves emitted from the housing are mainly emitted from the edge portion of the housing. Because the high-frequency current flowing over the housing strongly exists on the edge of the housing to serve as a wave source of radiation. Moreover, in view of the upper portion of the housing, the top side 2A of the housing 2 shown in FIG. 5 is only inclined at an angle of 30 degrees with respect to the vertical line to serve as a portion for emitting a large quantity of vertically polarized waves to serve as an important radiation source having an influence on radio communication.

Although the high-frequency current also exists on the right and left edges of the housing 2, this is ignored herein. The reasons for this are two reasons that the right and left edges of the housing are inclined at 60 degrees with respect to the vertical line to emit only a small quantity of vertically polarized waves and that most of the right and left edges of the housing are covered with the user's hand to decrease the quantity of radiation. That is, the radiation of vertically polarized waves from the ignored portion is not important for radio communication.

Thus, if the radiation from the linear antenna 3 is added to the radiation from the top side 2A of the housing 2, the quantity of radiation of vertically polarized waves increases, so that it is possible to carry out a good communication. In order to achieve this, the directions of currents serving as the wave sources of radiation must be the same. Therefore, in the portable radio terminal according to the present invention, the coincidence of the direction of the vector with the current on the housing is realized by changing the phase of the current on the antenna.

A method for changing the current on the antenna is carried out by the value of the load 7 for connecting the linear antenna 3 to the matching circuit 6. First, the operation for causing the current on the housing to be coincident with the vector by utilizing the variation in the current on the antenna which is changed by the variation in value of the load 7 will be described below.

Figures 6A, 6B, 6C:
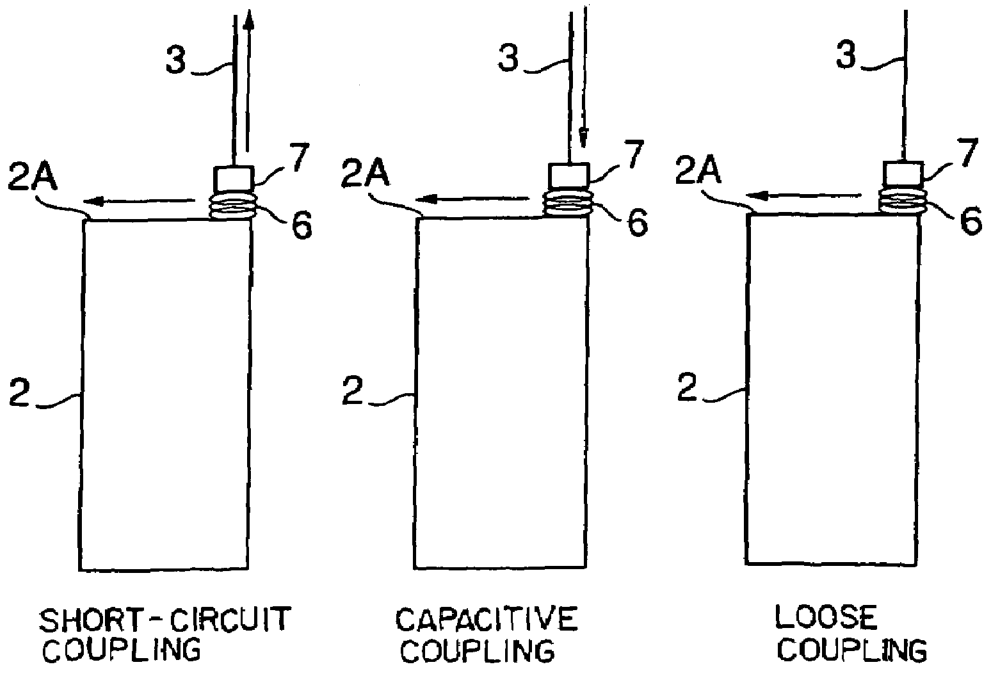
FIGS. 6A, 6B and 6C are front elevations showing currents flowing through a linear antenna and the top side of a housing in the first preferred embodiment, with respect to short-circuit coupling, capacitive coupling and loose coupling, respectively.

FIGS. 6A, 6B and 6C show the top side of the housing 2 and the current distribution on the linear antenna 3, according to the present invention. The respective distributions are simply shown for explanation. FIG. 6A shows the case of the short-circuit coupling, FIG. 6B shows the case of the capacitive coupling, and FIG. 6B shows the case of the loose coupling.

In the case of the short-circuit coupling shown in FIG. 6A, the current on the top side 2A of the housing 2 has the same phase as that at the feeding point on the basis of the phase of the current at the feeding point. On the other hand, the phase of the current on the linear antenna 3 is opposite to that at the feeding point. Because the current is supplied to the antenna 3 so as to include a phase delay by the matching circuit 6 having the length of a quarter wavelength. In this case, both of the directions of the current on the top side 2A of the housing 2 and the current on the linear antenna 2 are directions in which the currents leave the feeding point as shown in the figure.

In the case of the capacitive coupling shown in FIG. 6B, the phase of the current on the linear antenna 3 approaches the phase of the current at the feeding point. The reason why the capacitive coupling is different from the short-circuit coupling shown in FIG. 6A is that the phase lag of the current proceeds by the capacity of the load 7. In this case, although the current on the top side 2A of the housing 2 flows in a direction in which the current leaves the feeding point similar to the case of FIG. 6A, the current on the linear antenna 3 flows toward the feeding point unlike the case of FIG. 6A. In the case of the loose coupling shown in FIG. 6C, no current exists on the linear antenna 3, so that no arrow is shown.

Thus comparing FIG. 6A with FIG. 6B, the relationship between the phase of the current on the linear antenna 3 and the phase of the current on the top side 2A of the housing is different. The present invention has effectively utilized this phenomenon to realize an antenna for finely emitting polarized waves.

Figure 7A:
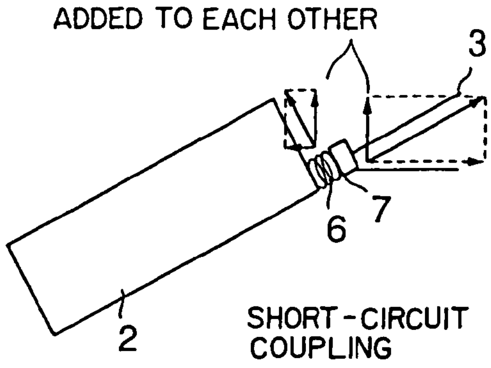
FIGS. 7A through 7D are illustrations showing that the quantity of radiated vertical polarization varies when the first preferred embodiment of a portable radio terminal according to according to the present invention is inclined to change the state of coupling.

FIG. 7A shows a case, where the terminal is held so that the antenna is arranged on the lower side and where the load 7 forms the short-circuit coupling. In this case, the current distributions of the linear antenna 3 and the top side 2A of the housing 2 are divided into vertical and horizontal components. As can be clearly seen from this figure, both of the vertical component of the linear antenna 3 and the vertical component of the top side 2A of the housing 2 are directed upwards, so that these vertical components are added to each other.

As a result, the vertical polarization component of radio waves emitted from the antenna increases. That is, according to the present invention, it is possible to realize an antenna of a portable radio terminal capable of finely emitting vertically polarized waves even if the terminal is held so that the antenna is arranged on the lower side.

Figure 7B:
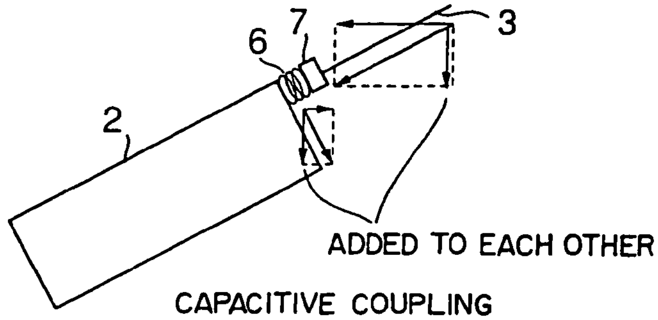

FIG. 7B shows a case where the terminal is held so that the antenna is arranged on the upper side and where the load 7 forms the capacitive coupling. In this case, the current distributions of the linear antenna 3 and the top side 2A of the housing 2 are divided into vertical and horizontal components. As can be clearly seen from this figure, both of the vertical component of the linear antenna 3 and the vertical component of the top side 2A of the housing 2 are directed downwards, so that these vertical components are added to each other.

As a result, the vertical polarization component of radio waves emitted from the antenna increases. That is, according to the present invention, it is possible to realize an antenna of a portable radio terminal capable of finely emitting vertically polarized waves even if the terminal is held so that the antenna is arranged on the upper side.

As described above, even if the terminal is held so that the antenna is arranged on the lower side (even if the terminal is held in the user's left hand), or even if the terminal is held so that the antenna is arranged on the upper side (even if the terminal is held in the user's right hand), it is possible to realize an antenna capable of finely emitting vertically polarized waves by switching the coupling state between the linear antenna 3 and the matching circuit 6 by changing the load 7.

Figure 7C:
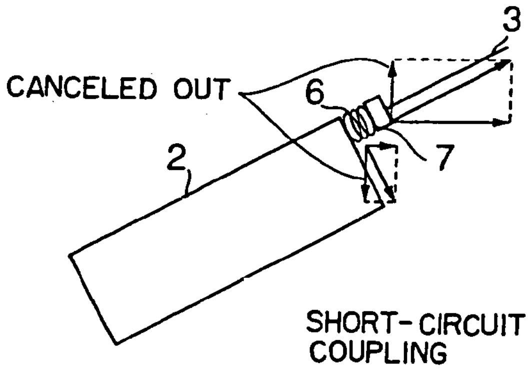
Figure 7D:
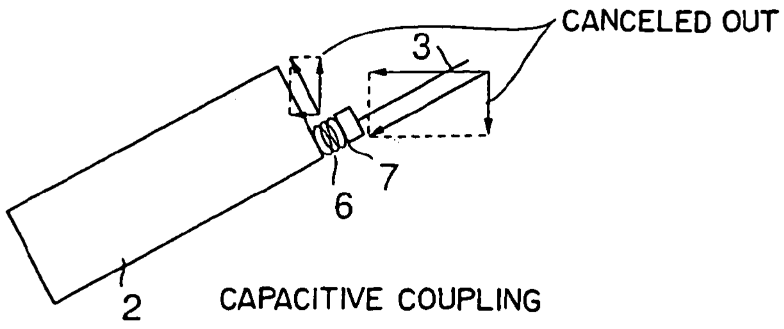

As shown in FIGS. 7C and 7D, in the case of the capacitive coupling when the antenna is arranged on the lower side and in the case of the short-circuit coupling when the antenna is arranged on the upper side, the vertical components of the currents on the antenna 3 and the top side 2A of the housing 2 are clearly directed in opposite directions, so that vertically polarized waves emitted therefrom are canceled out to decrease vertical polarization to deteriorate radio communication.

A case where the loose coupling is formed between the linear antenna 3 and the matching circuit 6 will be described below. In this case, it is assumed that the matching circuit 6 is a small helical antenna to be also operated as an antenna. This antenna has a smaller quantity of radiation than that of the linear antenna 3 having a half-wavelength, so that this quantity of radiation can be ignored in the case of the short-circuit coupling and in the case of the capacitive coupling. For example, there are some cases where the antenna contacts a large ear ring or a metal article mounted on a hat, a cap or the like to vary its characteristics to deteriorate its performance. In such cases, there are some cases where only the helical antenna is preferably used without the need of the linear antenna 3. In such cases, the linear antenna 3 may be connected to the helical antenna by the loose coupling to operate only the helical antenna.

As described above, according to the present invention, even if the portable radio terminal is held in the user's left or right hand to be used, the quantity of radiation of vertically polarized waves increases by switching the coupling state by the means for changing the load 7, so that it is possible to realize good radio communication.

Figure 8:
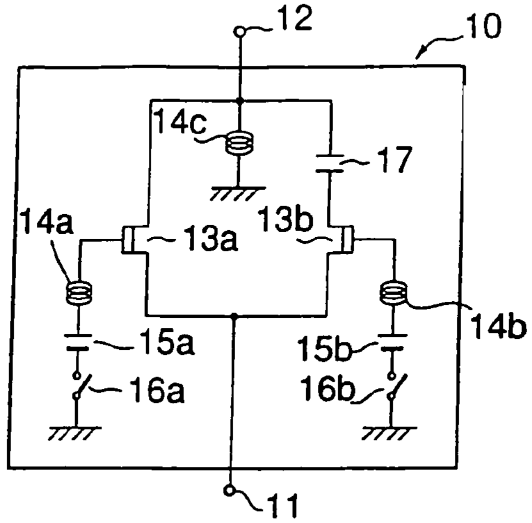
FIG. 8 is a circuit diagram showing the construction of the second preferred embodiment of load changing means according to the present invention.

Referring to the accompanying drawing, the second preferred embodiment of the present invention will be described below. FIG. 8 shows the construction of load changing means 10 for changing the value of the load in this preferred embodiment. The load changing means 10 comprises: a first port 11 to which the tip of the matching circuit 6 is connected; a second port 12 to which the lower end of the linear antenna 3 is connected; metal semiconductor field effect transistors (MESFETS) 13*a* and 13*b* serving as high-frequency switches; a plurality of reactances (L) 14*a*, 14*b* and 14*c*; bias power supplies 15*a* and 15*b*; switches 16*a* and 16*b*; and a capacitor 17.

The load changing means 10 can electrically change the coupling state by the plurality of reactances (L) 14*a*, 14*b* and 14*c* and the high-frequency switches 13*a* and 13*b* connected thereto. The high-frequency switch may comprise a PIN diode or a metal semiconductor field effect transistor (MESFET). In the drawing, each of the reactances (L) 14*a*, 14*b* and 14*c* may comprise a choke coil for interrupting high frequency waves, and the bias voltage sources 15*a* and 15 are designed to operate the MESFETs 13*a* and 13*b*, respectively.

With this construction, if the first switch 16*a* is turned ON, a bias voltage is applied to the first MESFET 13*a* which is in a short-circuit state as a high frequency. Then, if the second switch 16*b* is turned OFF, the second MESFET 13*b* is in an open state as a high frequency since no bias voltage is applied to the second MESFET 13*b*. As a result, the first port 11 is connected to the second port 12 via the first MESFET 13*a* which is in the short-circuit state, so that it is possible to realize the short-circuit coupling between the matching circuit 6 and the linear antenna 3.

On the other hand, if the first switch 16*a* is turned OFF and if the second switch 16*b* is turned ON, the first port 11 is connected to the second port 12 via the second MESFET 13*b*, which is in the short-circuit state, and the capacitor 17. The capacitance value of the capacitor 17 may be previously obtained by a simulation or experiment so that the capacitive coupling is formed between the matching circuit 6 and the linear antenna 3. As a result, it is possible to realize the capacitive coupling between the matching circuit 6 and the linear antenna 3. Finally, if both of the first switch 16*a* and the second switch 16*b* are turned OFF, the first port 11 is not connected to the second port 12. As a result, it is possible to realize the loose coupling between the matching circuit 16 and the linear antenna 3.

With the above described construction, it is possible to form the load changing means 10 capable of electrically changing the coupling state, so that it is possible to realize good radio communication. Furthermore, this imposes no burden on a person who uses the terminal since the coupling state can be electrically switched.

Figure 9:
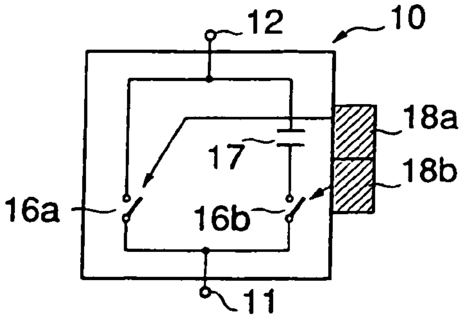
FIG. 9 is a schematic diagram showing the construction of the third preferred embodiment of load changing means according to the present invention.

Referring to the accompanying drawing, the third preferred embodiment of the present invention will be described below. FIG. 9 shows the construction of the third preferred embodiment of means for changing a load according to the present invention. The load changing means 10 for changing the load 7 has switches 16*a* and 16*b*, and switches 18*a* and 18*b* which mechanically operate like push button switches. By mechanically operating the switching of ON and OFF of the switches 16*a* and 16*b*, the coupling state is switched. Furthermore, similar to the second preferred embodiment, the tip of the matching circuit 6 is connected to the first port 11, and the lower end of the linear antenna 3 is connected to the second port 12.

According to the third preferred embodiment, it is not required to provide any electrically complicated constructions unlike the second preferred embodiment, so that the construction is simple. Although this operation is carried out by the user, it is not complicated and troublesome with respect to the extension and housing of the linear antenna 3. According to the present invention, it is possible to sufficiently obtain advantages if the on-off control action of the mechanical switches 18*a* and 18*b* is not frequently carried out.

In general, a user's hand in which a portable radio terminal is held tends to be one-sided, and tends to be the opposite hand to the user's dominant hand, although there are differences among individuals. If the portable radio terminal strongly tends to be held in any one hand, the mechanical switches 18*a* and 18*b* may be previously turned on so as to improve the characteristics of the antenna in that state, and the mechanical switches 18*a* and 18*b* may be switched only when the portable radio terminal is held in another hand. Furthermore, the principle of operation for switching the coupling is the same as that when the coupling is electrically switched, so that the description thereof is omitted. With the above described construction, it is possible to form the load changing means capable of mechanically changing the coupling state, so that it is possible to realize good radio communication.

Figure 10:
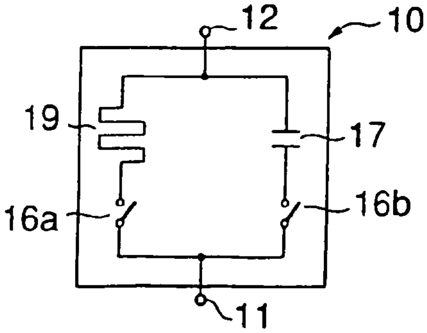
FIG. 10 is a schematic diagram showing the construction of the fourth preferred embodiment of load changing means according to the present invention.

Referring to the accompanying drawing, the fourth preferred embodiment of the present invention will be described below. FIG. 10 shows the construction of the fourth preferred embodiment of load changing means according to the present invention. The load changing means also has the function of adjusting the whole length of a combined antenna comprising the matching circuit 6 and the linear antenna 3.

In general, between when the matching circuit 6 is connected to the linear antenna 3 by the short-circuit coupling and when the matching circuit 6 is connected to the linear antenna 3 by the capacitive coupling, the length of the antenna required for the linear antenna 3 is different. This will be briefly described below. In the case of the capacitive coupling, the capacitor 17 is provided between the matching circuit 6 and the linear antenna 3. The capacitance characteristic of the capacitor 17 promotes the capacitive operations, which are caused in the base end of the linear antenna and the tip of the matching circuit 6, as an equivalent circuit to increase their capacitance value, so that it serves to decrease the resonance frequency of the linear antenna 3 and matching circuit 6.

That is, the resonance frequency of the matching circuit decreases. In order to suppress the decrease, the length of the linear antenna 3 may be decreased to raise the resonance frequency. In other words, the capacitor 17 for forming the capacitive coupling is equivalent to a linear element having a certain electric length.

According to the present invention, since the same matching circuit 6 is used even if the coupling state is changed, it is required to solve the above-described problem. Therefore, as shown in FIG. 10, a length adjusting element 19 is provided for increasing the length of a pass in the case of the short-circuit coupling. If the length adjusting element 19 is set to be equal to the electric length of the capacitor 17 for forming the capacitive coupling, the resonance frequency can be constant even if the coupling is changed, so that it is possible to carry out a good communication.

Furthermore, the length adjusting element 19 may be a linear element having a helical shape, a linear element having a meander shape, a micro strip line formed on a substrate, or any one of elements which can obtain the same effect.

As described above, according to the present invention, even if the coupling state of a coupling selecting element is changed, it is possible to carry out stable radio communication without the change of the resonance frequency by the effect of the length adjusting element provided in the load changing means.

The fifth preferred embodiment of the present invention will be described below. This fifth preferred embodiment relates to the electrical switching of the coupling state. In this preferred embodiment, load changing means is controlled so that the receiving state of the radio circuit 4 is optimum.

That is, the control circuit 9 monitors the receiving state of the radio circuit 4 to control the coupling state so as to maximize the receiving sensitivity. Thus, even if the user passes the portable radio terminal from the left hand to the right hand, it is possible to immediately changing the coupling state so as to obtain the maximum receiving sensitivity in the new hand. Furthermore, in a time division multiple access (TDMA) system such as a PDC, if this switching operation is carried out so as to switch the coupling state in a few micro seconds during the start of communication to select a good coupling state, it is possible to realize good radio communication.

Figure 11:
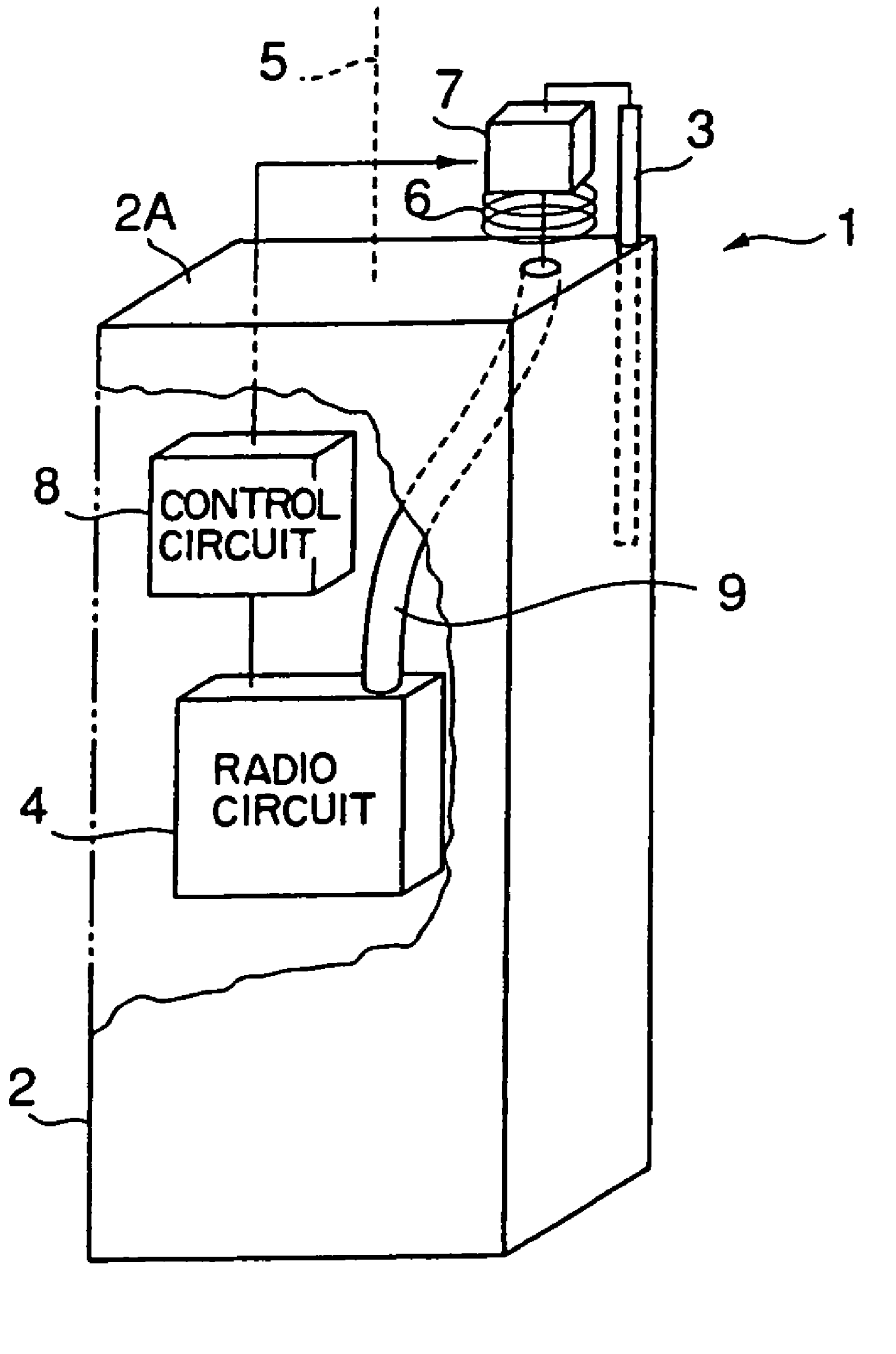
FIG. 11 is a perspective view showing the construction of the sixth preferred embodiment of a portable radio terminal according to the present invention.

The sixth preferred embodiment of the present invention will be described below. FIG. 11 shows the construction of the sixth preferred embodiment of a portable radio terminal according to the present invention. In FIG. 11, the same reference numbers are given to the same or corresponding elements as or to those in FIG. 4 or other figures, so that the duplicated descriptions thereof are omitted. In the portable radio terminal 1 in this sixth preferred embodiment, the linear antenna 3 is designed to be retractable in the housing 2. The lower end of the linear antenna 3 is connected to the load 7 when the linear antenna 3 is extended from the housing 2, and the upper end of the linear antenna 3 is connected to the load 7 when the linear antenna 3 is retracted into the housing 2. In the sixth preferred embodiment, the matching circuit 6 may be a linear matching element such as a small helical antenna.

When the linear antenna 3 is extended from the housing 2 to be used, the description thereof is the same as the above description to be omitted herein. When the linear antenna 3 is retracted into the housing 2, the operation is switched by the load changing means for changing the load 7. When the coupling state is changed to the loose coupling, only the linear matching element serving as the matching circuit 6 is operated, so that the linear antenna 3 does not equivalently exist. When the coupling state is changed to the short-circuit coupling or the capacitive coupling, both of the small antenna and the linear antenna 3 are operated.

As described above, when the linear antenna 3 is retracted into the housing 2, the advantages of the changing of the coupling state are as follows. It is considered that the retracted state is a waiting state. It is therefore considered that the portable radio terminal is in various states that it is housed in a bag or a pocket of pants. That is, in such states, it is desired that the portable radio terminal has a plurality of antenna forms to select the optimum antenna form therefrom. Thus, even if the linear antenna 3 is retracted into the housing 2, it is possible to carry out good radio communication regardless of the surrounding environment by changing the means for changing the load 7.

Figure 12:
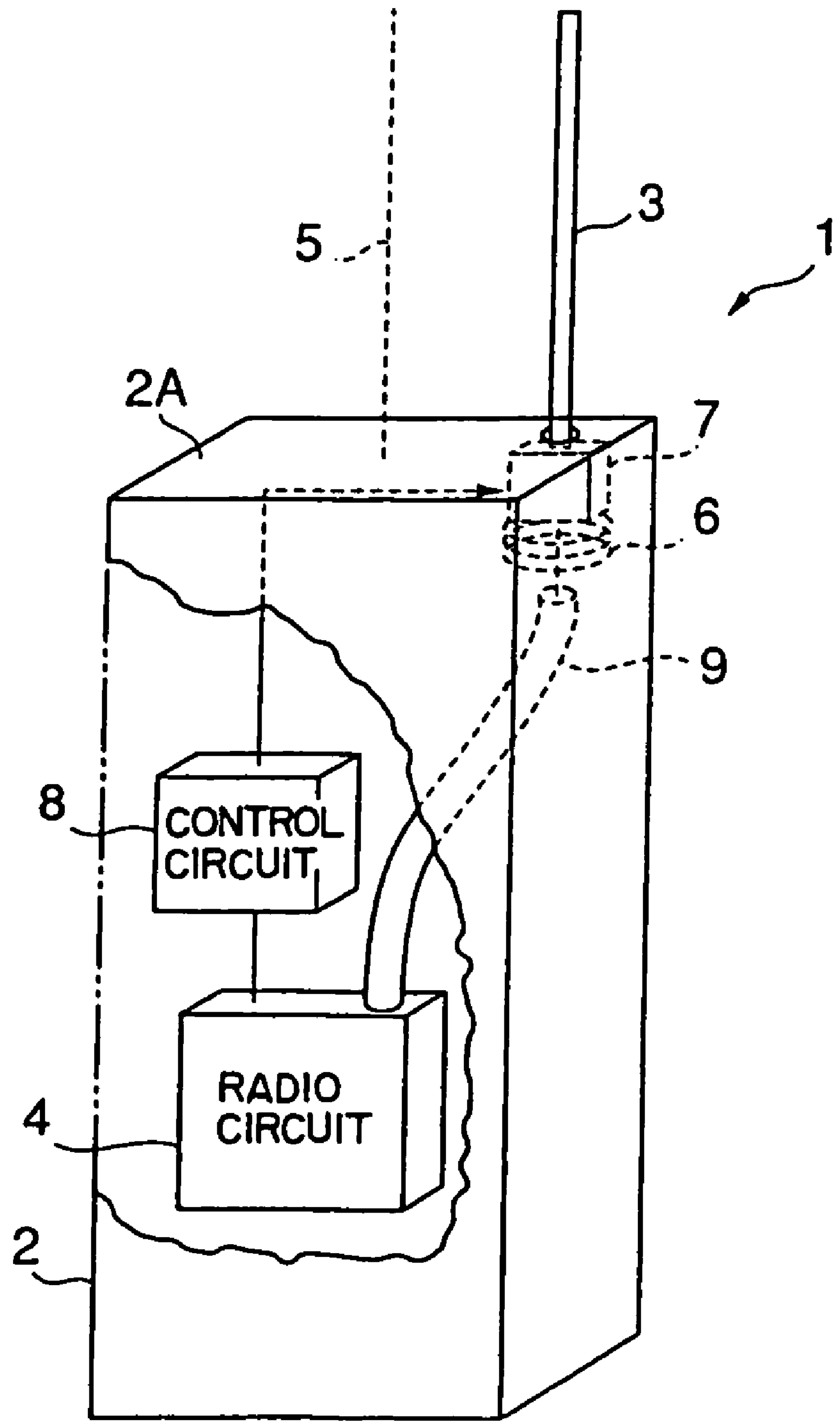
FIG. 12 is a perspective view showing the construction of the seventh preferred embodiment of a portable radio terminal according to the present invention.

Referring to the accompanying drawing, the seventh preferred embodiment of the present invention will be described below. FIG. 12 shows the construction of the seventh preferred embodiment of a portable radio terminal according to the present invention. The feature of this seventh preferred embodiment is that the matching circuit 6, the load 7 and the load changing means (not shown in FIG. 12) are included in the housing 2.

With this construction, the load changing means (not shown) may be formed on the substrate in the housing 2, so that there are advantages in that the terminal can be easily produced to decrease the costs. Moreover, since only the linear antenna 3 apparently exists outside of the housing 2, the portable radio terminal has strongly resistant to shock when it drops or the like.

Figure 13A:
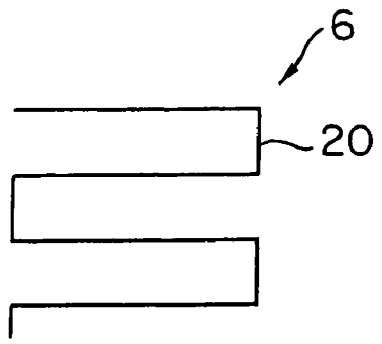
FIGS. 13A through 13F are illustrations schematically showing the construction or shape of a liner matching element serving as load changing means.

While the helical antenna having the matching circuit 6 having the length of a quarter wavelength has been used when it has been required to operate the matching circuit 6 as the antenna, a meander element 20 having an electric length of a quarter wavelength may be similarly formed as shown in FIG. 13A. While the length of the matching circuit 6 has been a quarter-wavelength, the above-described effects can be expected if the length of the matching circuit 6 is a half-wavelength, a three quarter-wavelength or any length. In addition, even if the portable radio terminal is held in the user's left or right hand, the optimum antenna construction can be obtained.

While the linear antenna 3 has been the straight antenna having the half-wavelength, the above-described effect can be expected if the length of the antenna is a three quarter-wavelength, a wavelength or any length. In addition, the shape of the linear antenna 3 should not be limited to the straight shape, but the above described effects can be expected if the linear antenna 3 is wounded as a helical shape or bent as a meander shape, or has any shape.

Figure 13B:
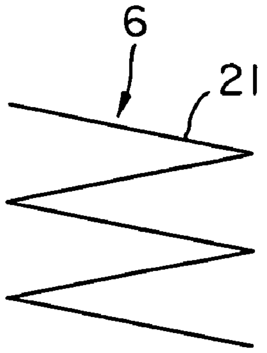

FIGS. 13A through 13F show some examples of matching circuits 6 of linear matching elements having predetermined shapes. In the example of FIG. 13A, the linear matching element serving as the matching circuit 6 is a meander matching element 20 which is formed so as to have a meander shape as the predetermined shape. In FIG. 13B, the linear matching element serving as the matching circuit 6 is a zigzag-shaped matching element 21 which is formed so as to have a zigzag shape as the predetermined shape.

Figure 13C:
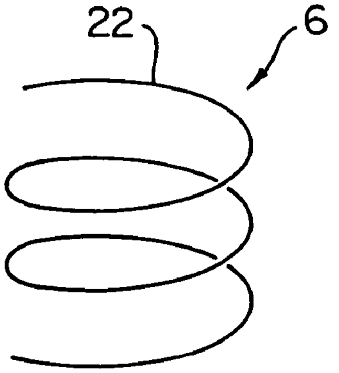

In FIG. 13C, the linear matching element serving as the matching circuit 6 is a helical matching element 22 which is formed so as to have a helical shape as the predetermined shape.

Figure 13D:
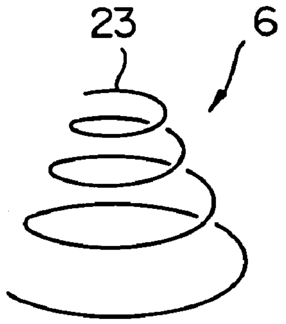

In FIG. 13D, the linear matching element serving as the matching circuit is a conical matching element 23 which is formed so as to have a conical helical shape as the predetermined shape.

Figure 13E:
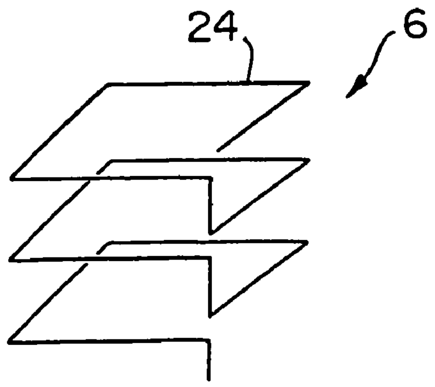

In FIG. 13E, the linear matching element serving as the matching circuit is a rectangular helical matching element 24 which is formed so as to have a rectangular helical shape as the predetermined shape.

Figure 13F:
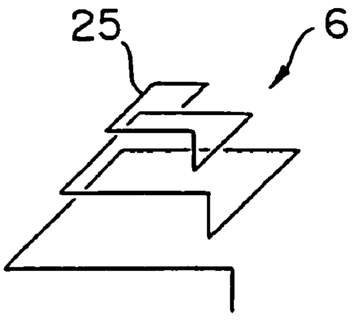

In FIG. 13F, the linear matching element serving as the matching circuit 6 is a pyramid helical shape as the predetermined shape.

While the linear matching elements have been formed so as to have the square prism or pyramid shapes, the present invention should not be limited thereto, but the linear matching element may be formed so as to have a rectangular prism or pyramid which is similar to the shape of the antenna mounting end face of the housing of the portable radio terminal. In addition, the plane shape of the linear matching element should not be limited to the circular or rectangular shape, but the linear matching element may be the shape of a polygonal prism or a polygonal pyramid which have another polygonal plane shape such as triangle, pentagon or hexagon.

While the capacitive coupling has been formed by the method for connecting the matching circuit 6 to the linear antenna 3 via a space and the method for inserting the capacitor, the physical dimension of the space and the value of the capacitor may be previously optimally determined by a simulation or experiment.

As described above, although the portable radio terminal according to the present invention has portions, the constructions of which are slightly similar to those of conventional portable radio terminals, the portable radio terminal according to the present invention is provided with the load changing means for changing the load, which has not been provided in the conventional portable radio terminal. Therefore, even if the portable radio terminal is held in any one of the user's left and light hands, the quantity of radiation of vertically polarized waves increases, so that it is possible to realize good radio communication with relatively simple constructions.

While the quantity of radiation of vertically polarized waves has been increased in the above-described preferred embodiments, the quantity of radiation of horizontally polarized waves may be increased by the combination of the constructions shown in FIGS. 7C and 7D. Therefore, even if the base station will emit horizontally polarized waves in future, the horizontally polarized waves can be finely received according to the present invention.

By providing the portable radio terminal with the means for changing the load, the quantity of radiation of the vertically polarized waves can be increased by switching the coupling state between the matching circuit and the linear antenna even if the terminal is held in the user's left or right hand, so that it is possible to realize good radio communication.

What is claimed is:

1. A portable radio terminal for improving the quality of a polarization efficiency, said terminal comprising:

a housing;

a radio circuit configured to be included in said housing;

a matching circuit configured to match radio waves during communication;

a linear antenna configured to extend along a longitudinal one side of said housing; and a load circuit which is provided between a tip of said matching circuit and base end of said linear antenna and which has a variable load value.

* * * * *